United States Patent
Zhao et al.

(10) Patent No.: US 12,510,924 B2
(45) Date of Patent: Dec. 30, 2025

(54) CASING ASSEMBLY AND MONITOR

(71) Applicant: WISTRON CORP., New Taipei (TW)

(72) Inventors: Chunlei Zhao, New Taipei (TW);
Liang Yang, New Taipei (TW);
Yao-Chen Yang, New Taipei (TW);
chia-jang Chen, New Taipei (TW);
chih chou Chou, New Taipei (TW)

(73) Assignee: WISTRON CORP., New Taipei (TW)

( * ) Notice: Subject to any disclaimer, the term of this patent is extended or adjusted under 35 U.S.C. 154(b) by 313 days.

(21) Appl. No.: 18/069,250

(22) Filed: Dec. 21, 2022

(65) Prior Publication Data

US 2024/0053790 A1     Feb. 15, 2024

(30) Foreign Application Priority Data

Aug. 15, 2022    (CN) .......................... 202210973381.6

(51) Int. Cl.
| | |
|---|---|
| *G06F 1/16* | (2006.01) |
| *G06F 1/18* | (2006.01) |
| *G09F 9/30* | (2006.01) |
| *G09F 9/33* | (2006.01) |

(52) U.S. Cl.
CPC ............ *G06F 1/1601* (2013.01); *G06F 1/181* (2013.01); *G09F 9/33* (2013.01); *G06F 2200/1612* (2013.01); *G09F 9/30* (2013.01)

(58) Field of Classification Search
CPC ................... G06F 1/1601; G06F 1/181; G06F 2200/1612; G09F 9/33; G09F 9/30
See application file for complete search history.

(56) References Cited

U.S. PATENT DOCUMENTS

| | | | | |
|---|---|---|---|---|
| 5,026,588 A | * | 6/1991 | Diekmann | ........... A47B 95/043 |
| | | | | 428/192 |
| 6,109,434 A | * | 8/2000 | Howard, Jr. | .......... G06F 1/1603 |
| | | | | 206/521 |

(Continued)

FOREIGN PATENT DOCUMENTS

| | | |
|---|---|---|
| CN | 213601015 U | 7/2021 |
| TW | 201137446 A | 11/2011 |

(Continued)

OTHER PUBLICATIONS

TW Office Action dated Oct. 6, 2023 in Taiwan application No. 111132842.

(Continued)

*Primary Examiner* — Allen L Parker
*Assistant Examiner* — Martin Antonio Asmat Uceda
(74) *Attorney, Agent, or Firm* — McClure, Qualey & Rodack, LLP

(57) ABSTRACT

A monitor includes a casing assembly, a light-emitting module and a display panel. The casing assembly includes a casing and a support frame. The support frame is disposed in the casing. The support frame includes an accommodation portion and at least one support portion, the accommodation portion is connected to the casing, the support portion is connected to the accommodation portion and protrudes from the accommodation portion. The light-emitting module is disposed in the accommodation portion. The display panel is supported by the at least one support portion.

18 Claims, 7 Drawing Sheets

(56) References Cited

U.S. PATENT DOCUMENTS

| | | | |
|---|---|---|---|
| 6,734,928 B2* | 5/2004 | Ito | G02F 1/133308 349/58 |
| 7,142,264 B2* | 11/2006 | Choi | G02F 1/133604 349/65 |
| 7,178,967 B2* | 2/2007 | Kim | G02F 1/133308 362/225 |
| 7,184,110 B2* | 2/2007 | Kim | G02F 1/133608 349/60 |
| 7,578,609 B2* | 8/2009 | Chang | G02F 1/133608 362/633 |
| 7,651,257 B2* | 1/2010 | Shin | G02F 1/133608 362/609 |
| 7,665,879 B2* | 2/2010 | Hsieh | G02F 1/133604 362/633 |
| 7,819,574 B2* | 10/2010 | Yoo | G02F 1/133608 362/609 |
| 7,868,971 B2* | 1/2011 | Zensai | G02F 1/133608 349/58 |
| 7,921,997 B2* | 4/2011 | Burns | G06F 1/1616 361/679.01 |
| 8,350,982 B2* | 1/2013 | Choi | G02F 1/133308 349/58 |
| 8,411,226 B2 | 4/2013 | Kao et al. | |
| 8,439,550 B2* | 5/2013 | Sohn | F21V 15/01 362/633 |
| 8,453,387 B2* | 6/2013 | Goepfert | A47B 57/565 52/36.5 |
| 8,462,291 B2* | 6/2013 | Chen | G02F 1/133608 349/61 |
| 8,550,689 B2* | 10/2013 | Han | G02B 6/0088 362/634 |
| 8,696,189 B2* | 4/2014 | Yu | G02B 6/0088 362/621 |
| 8,789,698 B2* | 7/2014 | Kuo | B65D 81/022 349/58 |
| 8,836,886 B2* | 9/2014 | Yu | G02F 1/133308 349/158 |
| 8,845,177 B2* | 9/2014 | Kuo | G02F 1/133608 362/621 |
| 8,902,381 B2* | 12/2014 | Hsiao | G02F 1/133605 349/67 |
| 8,908,371 B2* | 12/2014 | Ariga | H05K 5/0026 361/679.55 |
| 9,007,544 B2* | 4/2015 | Morizuka | G06F 1/1601 349/62 |
| 9,084,337 B2* | 7/2015 | Gu | G06F 1/1601 |
| 9,218,763 B2* | 12/2015 | Hwangbo | G06F 1/1601 |
| 9,414,507 B2* | 8/2016 | Lv | F16B 5/0084 |
| 9,696,769 B1* | 7/2017 | Hamilton | H05K 5/03 |
| 9,740,047 B2* | 8/2017 | Oh | G02F 1/133608 |
| 9,804,429 B2 | 10/2017 | Son et al. | |
| 9,810,934 B2* | 11/2017 | Choi | G02F 1/133308 |
| 9,880,350 B2* | 1/2018 | Kim | G02B 6/0031 |
| 9,964,694 B2* | 5/2018 | Okitsu | G02B 6/0088 |
| 10,082,693 B2 | 9/2018 | Son et al. | |
| 10,129,995 B2* | 11/2018 | Kwon | G06F 1/1601 |
| 10,180,534 B2* | 1/2019 | Oh | G06F 1/1637 |
| 10,180,596 B2* | 1/2019 | Kim | G02F 1/133608 |
| 10,222,542 B2* | 3/2019 | Arita | G02B 6/0088 |
| 10,345,513 B2* | 7/2019 | Sugimoto | G02F 1/133308 |
| 10,564,456 B2 | 2/2020 | Son et al. | |
| 10,670,799 B2* | 6/2020 | Lee | G02B 6/0088 |
| 10,809,815 B2* | 10/2020 | Tabata | G02F 1/13338 |
| 10,859,759 B2* | 12/2020 | Isono | G02B 6/0088 |
| 11,192,348 B2* | 12/2021 | Han | B32B 5/028 |
| 11,257,892 B2* | 2/2022 | Luo | G06F 1/1601 |
| 11,378,832 B2* | 7/2022 | Lee | G02F 1/133608 |
| 11,747,870 B2* | 9/2023 | Xu | G02F 1/133317 361/679.02 |
| 2006/0260168 A1* | 11/2006 | Yang | G06F 1/1601 40/700 |
| 2008/0018825 A1* | 1/2008 | Lee | G02B 6/009 445/24 |
| 2008/0143918 A1* | 6/2008 | Kim | G02F 1/133608 362/362 |
| 2009/0289880 A1* | 11/2009 | Byoun | G09F 9/30 345/87 |
| 2012/0002130 A1* | 1/2012 | Watanabe | G02F 1/133308 349/60 |
| 2014/0036534 A1* | 2/2014 | Jeong | G02B 6/0088 362/611 |
| 2014/0376257 A1* | 12/2014 | Sawada | G06F 3/041 362/606 |
| 2018/0217314 A1* | 8/2018 | Pei | G02B 6/0065 |
| 2018/0224595 A1* | 8/2018 | Sugiyama | G02B 6/0083 |
| 2020/0081482 A1* | 3/2020 | Huang | F21V 33/0052 |
| 2021/0030171 A1* | 2/2021 | Hummons | G06F 1/1607 |

FOREIGN PATENT DOCUMENTS

| | | |
|---|---|---|
| TW | 201215953 A | 4/2012 |
| TW | I440934 B | 6/2014 |

OTHER PUBLICATIONS

TW Office Action dated Nov. 11, 2024 in Taiwan application No. 111132842.

* cited by examiner

CASING ASSEMBLY AND MONITOR

CROSS-REFERENCE TO RELATED APPLICATIONS

This non-provisional application claims priority under 35 U.S.C. § 119(a) on Patent Application No(s). 202210973381.6 filed in China on Aug. 15, 2022, the entire contents of which are hereby incorporated by reference.

TECHNICAL FIELD

The disclosure relates to a casing assembly and a monitor, more particularly to a casing assembly including a support frame and a monitor including the casing assembly.

BACKGROUND

In general, there are several frames installed in a conventional monitor, which are a light-emitting module frame, a panel frame, and an intermediate frame. The light-emitting module frame and the panel frame are respectively for supporting a light-emitting module and a display panel, and the two frames are supported by the intermediate frame. In order to achieve a light and thin monitor, manufacturers further integrate the aforementioned frames with a casing of the monitor in a manner where the frames are embedded into the casing of the monitor by means of injection molding.

However, according to the current technology, injection molding means is only applicable for embedding the frames into the casing of a 32-inch or smaller monitor. It is difficult for manufacturers to embed the frames into the casing of a 32-inch or larger monitor via injection molding. Therefore, the structure of the 32-inch or larger monitor is more complex, which increases manufacturing costs and is difficult to meet the requirements of lightness and thinness. Therefore, how to solve the aforementioned issue is one of the crucial topics in this field.

SUMMARY

The disclosure provides a casing assembly and a monitor which allows a large-sized monitor to be light and thin.

One embodiment of the disclosure provides a monitor. The monitor includes a casing assembly, a light-emitting module and a display panel. The casing assembly includes a casing and a support frame. The support frame is disposed in the casing. The support frame includes an accommodation portion and at least one support portion, the accommodation portion is connected to the casing, the support portion is connected to the accommodation portion and protrudes from the accommodation portion. The light-emitting module is disposed in the accommodation portion. The display panel is supported by the at least one support portion.

Another embodiment of the disclosure provides a casing assembly. The casing assembly includes a casing, a positioning component and a support frame. The positioning component is fixed to the casing. The support frame disposed in the casing. The support frame includes an accommodation portion, at least one support portion and a positioning portion, the accommodation portion is fixed to the casing, the support portion is connected to the accommodation portion and protrudes from the accommodation portion. The positioning portion is connected to the support portion, and the positioning portion is engaged with the positioning component.

According to the casing assembly and the monitor as discussed in the above embodiments, the support frame has the accommodation recess, and the support portion is connected to the accommodation portion and protrudes outwardly from the accommodation portion, such that the light-emitting module can be accommodated in the accommodation recess, and the display panel is supported by the support portion. Therefore, the support frame simultaneously supports the light-emitting module and the display panel. Accordingly, even if the monitor is a large-sized monitor, the monitor can be still light and thin, and the monitor can be produced in low cost.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
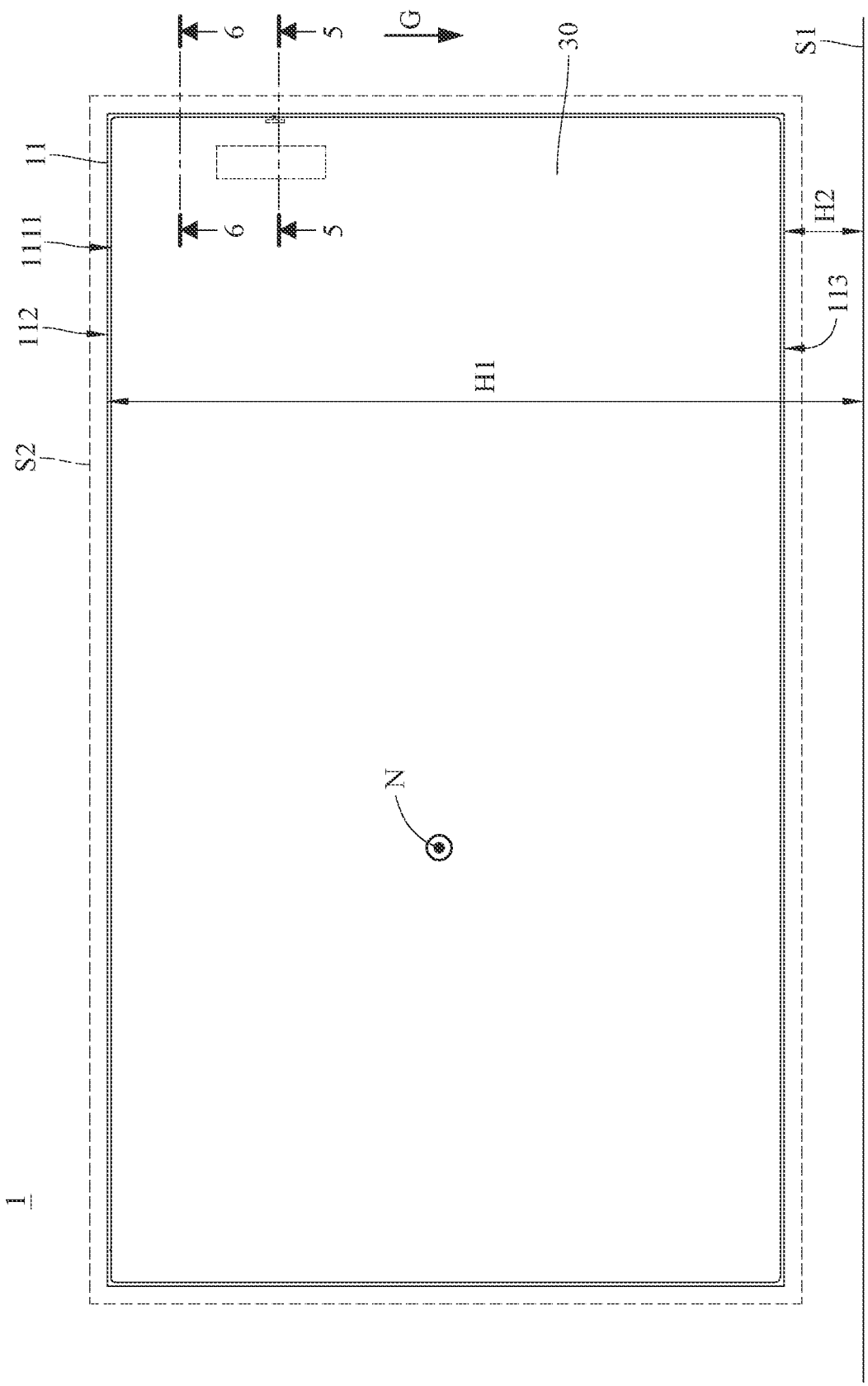
FIG. 1 is a front view of a monitor according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
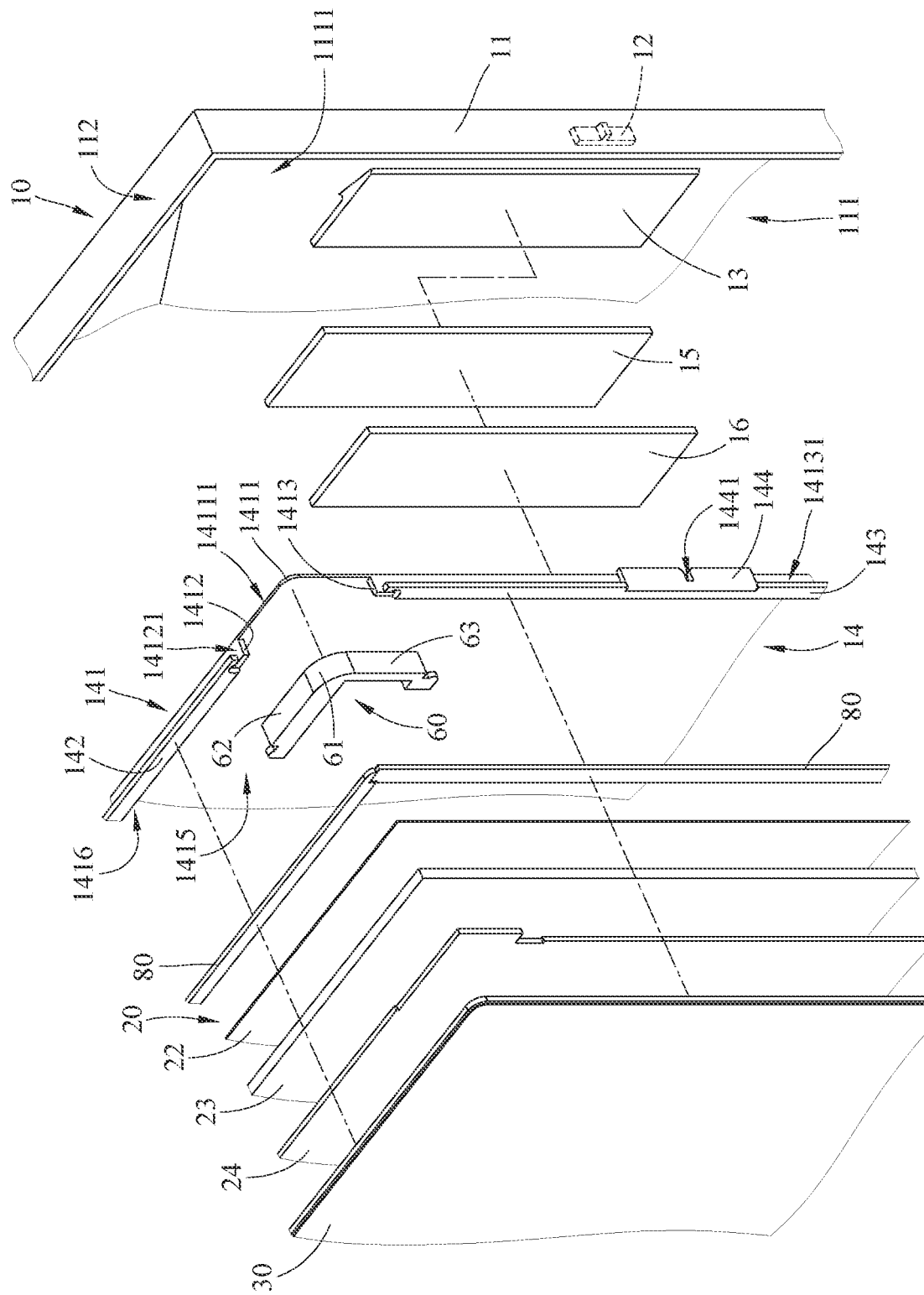
FIG. 2 is a partial exploded view of the monitor in FIG. 1.
Figure 3:
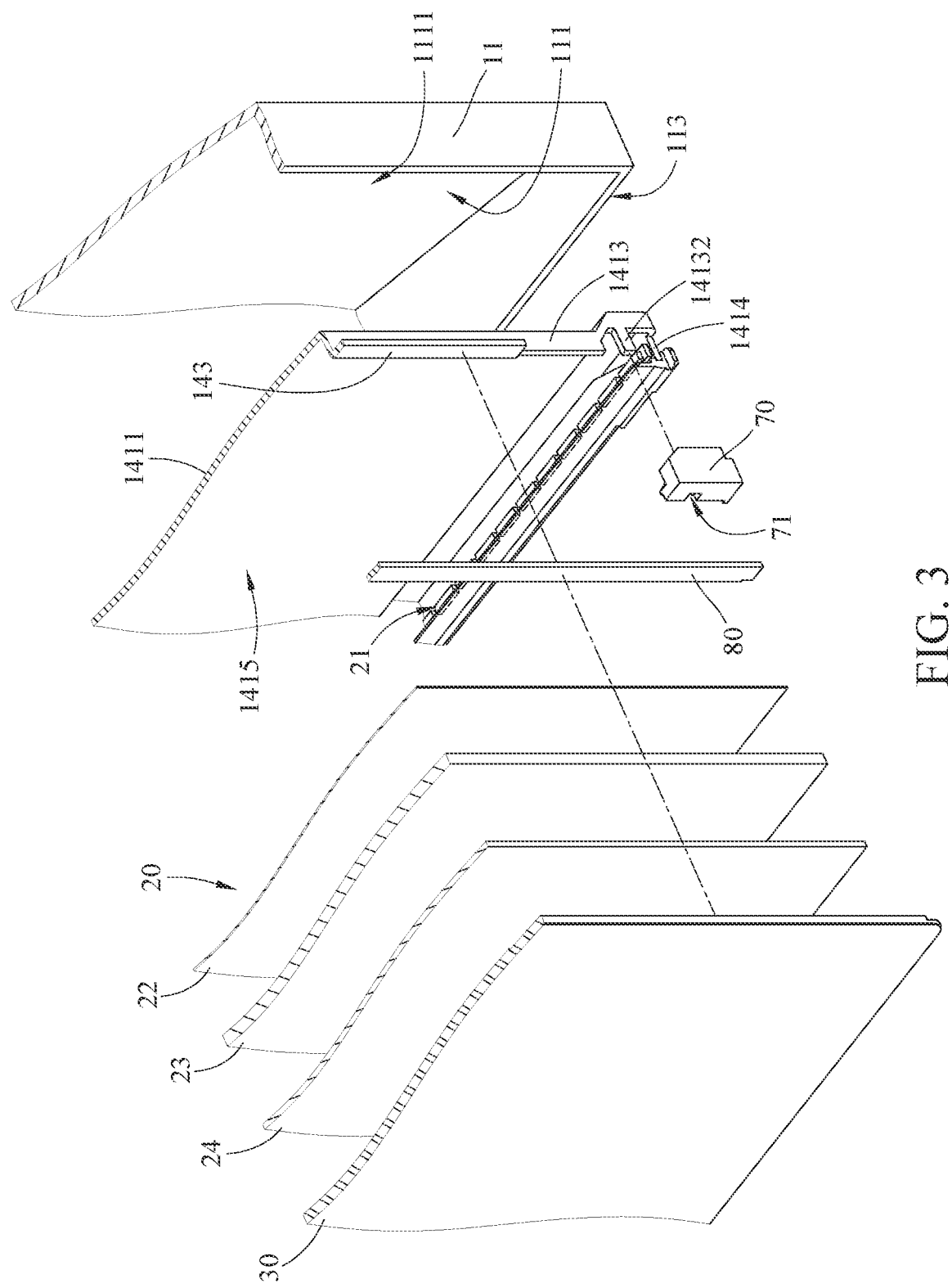
FIG. 3 is another partial exploded view of the monitor in FIG. 1.

Refer to FIGS. 1 to 3, where FIG. 1 is a front view of a monitor 1 according to a first embodiment of the disclosure, FIG. 2 is a partial exploded view of the monitor 1 in FIG. 1, and FIG. 3 is another partial exploded view of the monitor 1 in FIG. 1.

In this embodiment, the monitor 1 is, for example, a large-sized monitor. The so-called large-sized monitor is defined as a monitor having a size larger than that of a 32-inch monitor. The monitor 1 includes a casing assembly 10, a light-emitting module 20 and a display panel 30. In addition, the monitor 1 may further include a plurality of adhesive components 80.

The casing assembly 10 includes a casing 11, a positioning component 12, a support 13, a support frame 14, a first engagement component 15 and a second engagement component 16. The casing 11 has an accommodation space 111, a top side 112 and a bottom side 113. The top side 112 and the bottom side 113 are respectively located at two opposite sides of the accommodation space 111. In the case that the monitor 1 is placed upright above a horizontal plane S1, and a normal line N of a plane S2 where an opening 1111 of the accommodation space 111 is located is perpendicular to a gravity direction G, a height H1 of the top side 112 relative to the horizontal plane S1 is greater than a height H2 of the bottom side 113 relative to the horizontal plane S1. The positioning component 12 and the support 13 are located in the accommodation space 111 and fixed to the casing 11. In this embodiment, the positioning component 12, the support 13 and the casing 11 are made of a single piece, but the disclosure is not limited thereto; in some other embodiments, the positioning component, the support and the casing may be made of different pieces.

The support frame 14 is located in the accommodation space 111 of the casing 11, and the support frame 14 includes an accommodation portion 141, a first support portion 142, a second support portion 143 and a positioning portion 144. The accommodation portion 141 includes a bottom plate 1411 and a plurality of side plates 1412, 1413 and 1414. The side plates 1412, 1413 and 1414 are respectively and integrally connected to different sides of the bottom plate 1411, and the side plates 1412, 1413 and 1414 and the bottom plate 1411 together form an accommodation recess 1415. Among the side plates 1412, 1413 and 1414, the side plate 1412 is located closest to the top side 112 of the casing 11, the side plate 1414 is located closest to the bottom side 113 of the casing 11, and the side plate 1413 is located between the side plates 1412 and 1414. The first support portion 142 and the second support portion 143 are respectively and integrally connected to the side plates 1412 and 1413 which are located adjacent to each other, and the first support portion 142 is located closer to the top side 112 of the casing 11 than the second support portion 143. The first support portion 142 and the second support portion 143 are located close to an opening 1416 of the accommodation recess 1415, and the first support portion 142 and the second support portion 143 respectively protrude outwardly from outer surfaces 14121 and 14131 of the sides plates 1412 and 1413 facing away from the accommodation recess 1415 at ends of the side plates 1412 and 1413 of the accommodation portion 141 located opposite to the bottom plate 1411. The positioning portion 144 is connected to the second support portion 143, and the positioning portion 144, the second support portion 143 and the side plate 1413 connected to the second support portion 143 together form a U-shaped structure. The positioning portion 144 is engaged with the positioning component 12. For example, the positioning portion 144 has an insertion hole 1441, and the positioning component 12 is inserted into the insertion hole 1441 so as to position the support frame 14.

Note that the positioning portion 144 is not restricted to having the insertion hole 1441. As long as the positioning portion can be engaged with the positioning component, the positioning portion and the positioning component may be modified to have other types of the structures.

Note that the quantities of the positioning portion 144 of the support frame 14 and the positioning component 12 is not restricted in the disclosure and may be modified to be more than one in some other embodiments. In such a configuration, the positioning portions may be connected to the first support potion and the second support portion and spaced apart from one another, and the positioning components may be respectively inserted into the positioning portions. In another embodiment, the support frame may not have any positioning portion, and the casing assembly may not have any positioning component.

The first engagement component 15 and the second engagement component 16 are hook-and-loop fasteners. For example, one of the first engagement component 15 and the second engagement component 16 is the hook fastener, and the other is the loop fastener. The first engagement component 15 is fixed to the support 13, and the second engagement component 16 is fixed to a surface 14111 of the bottom plate 1411 of the accommodation portion 141 of the support frame 14 facing away from the accommodation recess 1415. The bottom plate 1411 of the accommodation portion 141 is fixed to the casing 11 via the first engagement component 15, the second engagement component 16 and the support 13.

In this embodiment, the bottom plate 1411 of the accommodation portion 141 is fixed to the casing 11 via the hook and loop fasteners and the support 13 instead of via additional frames, which facilitates the monitor 1 to be light in weight and thin in size. In addition, the first engagement component 15 and the second engagement component 16 are the hook and loop fasteners, which ensures the bottom plate 1411 to be firmly fixed to the casing 11 even if the casing 11 or the support frame 14 is deformed due to heat generated by the monitor 1.

Note that the bottom plate 1411 of the accommodation portion 141 is not restricted to being fixed on the casing 11 via single one first engagement component 15, single one second engagement component 16 and single one support 13. In some other embodiments, the bottom plate of the accommodation portion may be fixed to the casing via a plurality of first engagement components, a plurality of second engagement components and a plurality of supports.

Furthermore, in another embodiment, the bottom plate of the accommodation portion may be fixed to the casing further via an additional suitable means.

Moreover, the first engagement component 15, the second engagement component 16 and the support 13 are optional components and structures. In some other embodiments, the monitor may not have any first engagement component and any second engagement component, and the casing assembly may not have any support. In such a configuration, the bottom plate of the accommodation portion may be fixed to the casing via another suitable means, such as screws or adhesive.

Figure 4:
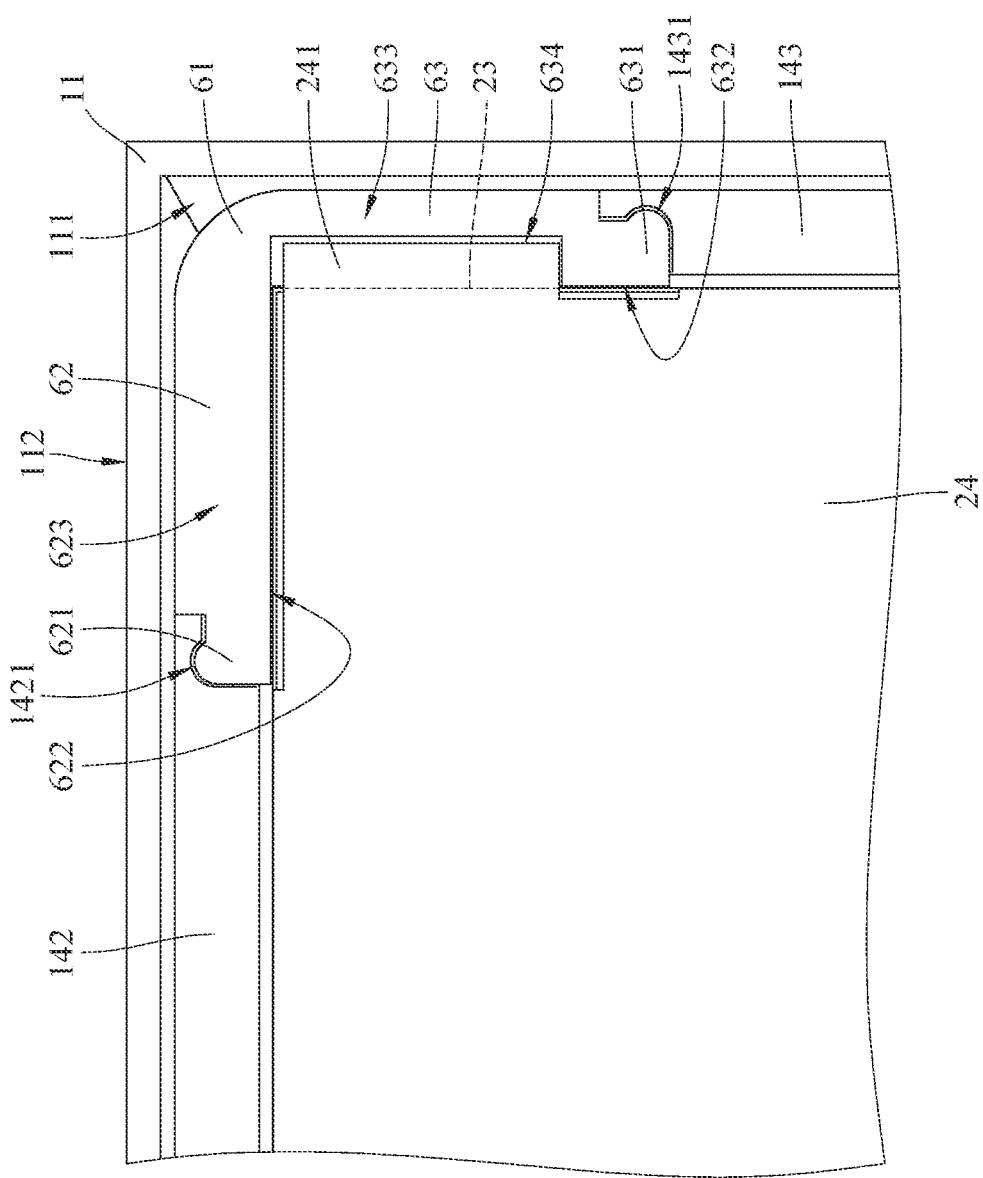
FIG. 4 is a partial front view of the monitor in FIG. 1 when a display panel of the monitor is removed.
Figure 5:
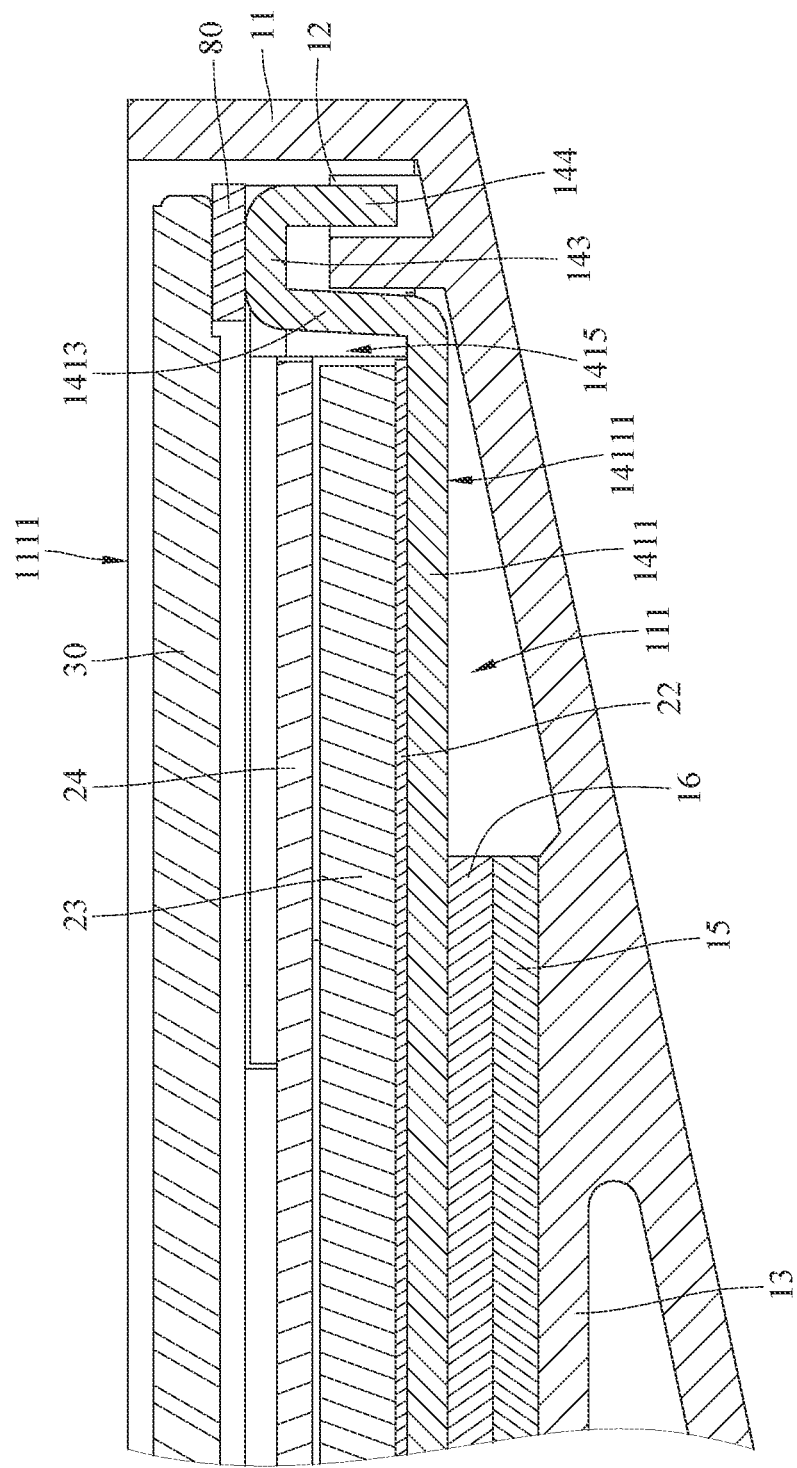
FIG. 5 is a partial cross-sectional view of the monitor in FIG. 1 taken along a line 5-5.
Figure 6:
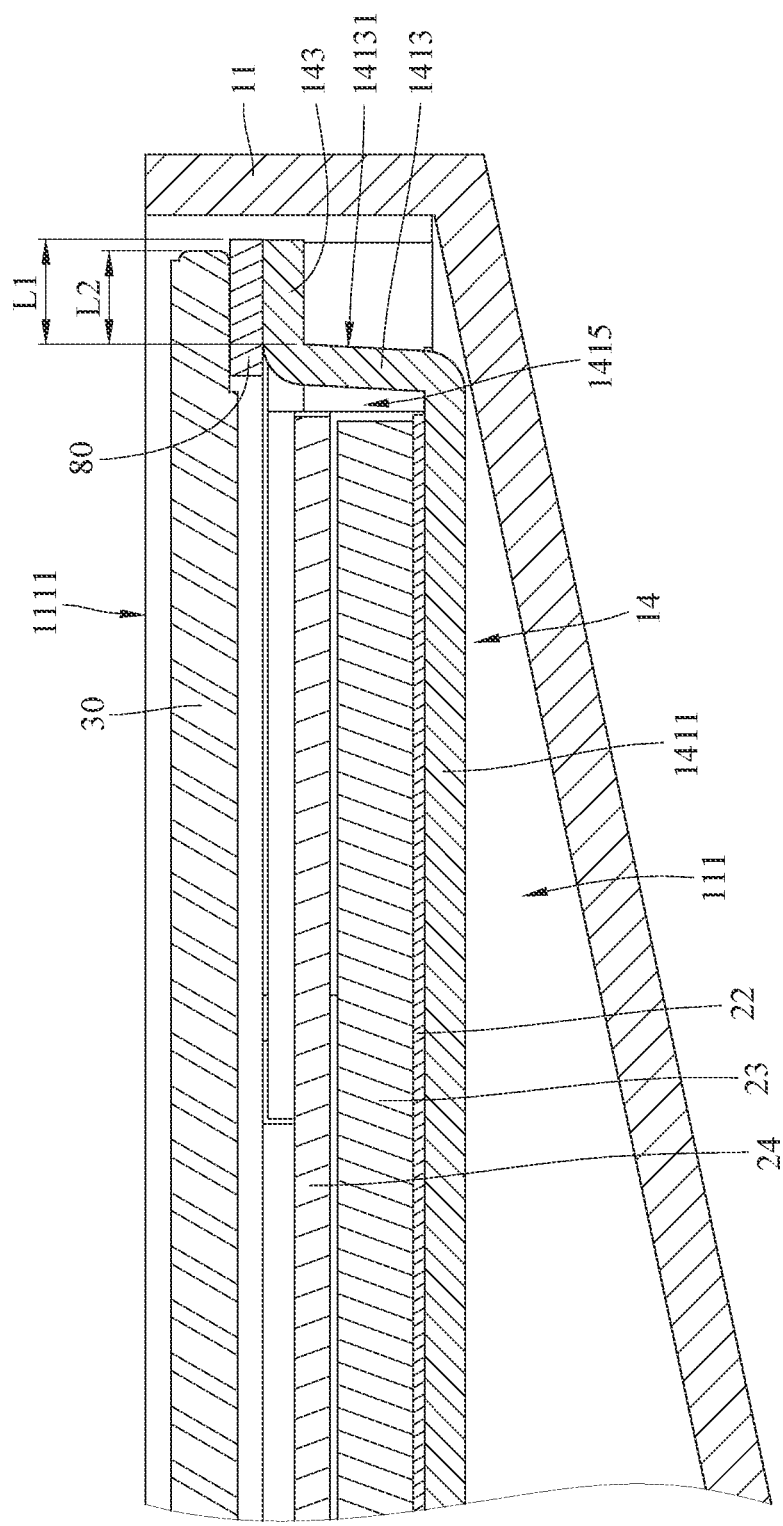
FIG. 6 is a partial cross-sectional view of the monitor in FIG. 1 taken along a line 6-6.

Then, refer to FIGS. 2 to 6, where FIG. 4 is a partial front view of the monitor 1 in FIG. 1 when the display panel 30 of the monitor 1 is removed, FIG. 5 is a partial cross-sectional view of the monitor 1 in FIG. 1 taken along a line 5-5, and FIG. 6 is a partial cross-sectional view of the monitor 1 in FIG. 1 taken along a line 6-6.

The light-emitting module 20 includes a light source assembly 21, a reflection plate 22, a light guide 23 and an optical film 24. The light source assembly 21 is, for example, a LED assembly. The light source assembly 21 is disposed in the accommodation recess 1415 of the accommodation portion 141 and fixed to the side plate 1414 located closest to the bottom side 113 of the casing 11. The reflection plate 22, the light guide 23 and the optical film 24 are sequentially stacked in the accommodation recess 1415 of the accommodation portion 141 of the support frame 14.

In this embodiment, the casing assembly 10 may further include a first light shield 60, and the first light shield 60 is, for example, made of rubber material. The first light shield 60 includes a connection portion 61, a first extension portion 62 and a second extension portion 63. The first extension portion 62 and the second extension portion 63 extend from the connection portion 61 along two different directions. The first extension portion 62 and the second extension portion 63 are respectively fixed to one side of the first support portion 142 and one side of the second support portion 143 for preventing light from leaking between the first support portion 142 and the second support portion 143.

In this embodiment, the first support portion 142 of the support frame 14 has an engagement hole 1421, and the second support portion 143 has an engagement hole 1431, where the engagement hole 1421 of the first support portion 142 and the engagement hole 1431 of the second support portion 143 each is, for example, a half of a pear-shaped hole. The first extension portion 62 of the first light shield 60 has an engagement protrusion 621, and the second extension portion 63 has an engagement protrusion 631, where shapes of the engagement protrusion 621 of the first extension portion 62 and the engagement protrusion 631 of the second extension portion 63 respectively mate that of the engagement hole 1421 of the first support portion 142 and the engagement hole 1431 of the second support portion 143. The engagement protrusion 621 of the first extension portion 62 and the engagement protrusion 631 of the second extension portion 63 are respectively engaged with the engagement hole 1421 of the first support portion 142 and the engagement hole 1431 of the second support portion 143, such that the first light shield 60 is fixed to the first support portion 142 and the second support portion 143 of the support frame 14.

In this embodiment, the cooperation of the engagement protrusions 621 and 631 of the first extension portion 62 and the second extension portion 63 of the first light shield 60 and engagement holes 1421 and 1431 of the first support portion 142 and the second support portion 143 can position the first light shield 60 and prevent the first light shield 60 from moving when heat is applied thereto.

Note that the shapes of the engagement holes 1421 and 1431 of the first support portion 142 and the second support portion 143 and the shapes of the engagement protrusions 621 and 631 of the first extension portion 62 and the second extension portion 63 of the first light shield 60 are not restricted and may be modified to other suitable shapes in some other embodiments. In another embodiment, the first support portion and the second support portion may not have any engagement hole, and the first extension portion and the second extension portion of the first light shield may not have any engagement protrusion. In such a configuration, the first extension portion and the second extension portion of the first light shield may be fixed to the first support portion and the second support portion via another suitable means, such as adhering.

In this embodiment, the first extension portion 62 of the first light shield 60 may further have a contact surface 622 and a support surface 623. The contact surface 622 and the support surface 623 respectively face different directions, where the contact surface 622 faces the accommodation recess 1415, and the support surface 623 supports the display panel 30. The second extension portion 63 may further have a contact surface 632, a support surface 633 and a positioning recess 634. The contact surface 632 and the support surface 633 respectively face different directions, where the contact surface 632 faces the accommodation recess 1415, and the support surface 633 supports the display panel 30. Different sides of the positioning recess 634 are respectively located at the contact surface 632 and the support surface 633.

The contact surface 622 of the first light shield 60 and the contact surface 632 of the second extension portion 63 are respectively in contact with adjacent sides of the light guide 23 so as to position the light guide 23. The optical film 24 has a protrusion portion 241, and the protrusion portion 241 is engaged with the positioning recess 634 of the second extension portion 63 so as to position the optical film 24.

Note that the quantity of the first light shield 60 is not restricted in the disclosure and may be modified to be two in some other embodiments. In such a configuration, the two first light shields may be disposed at two opposite corners of the support frame located closer to the top side of the casing.

In addition, the first extension portion 62 and the second extension portion 63 of the first light shield 60 are respectively fixed to the first support portion 142 and the second support portion 143 located adjacent to each other, but the disclosure is not limited thereto; in some other embodiments, the first extension portion and the second extension portion of the first light shield may be fixed to two support portion not located adjacent to each other.

Moreover, the first light shield 60 is an optional component; in some other embodiments, the monitor may not have any first light shield when there is no need to prevent light from leaking and position the light guide and the optical film.

In this embodiment, the casing assembly 10 may further include a second light shield 70 The second light shield 70 is, for example, made of rubber material. The second light shield 70 has an insertion hole 71, and the side plate 1413 connected to the second support portion 143 of the support frame 14 has a mount pillar 14132, the mount pillar 14132 is located at one side of the side plate 1413 located closest to the side plate 1414. The mount pillar 14132 of the side plate 1413 is inserted into the insertion hole 71 of the second light shield 70, and the second light shield 70 and the second extension portion 63 of the first light shield 60 are respectively located at two opposite sides of the second support portion 143. The second light shield 70 can prevent light from leaking between the side plate 1414 located closest to the bottom side 113 of the casing 11 and the side plate 1413 connected to the second support portion 143.

Note that the quantity of the second light shield 70 is not restricted in the disclosure and may be modified to be two in some other embodiments. In such a configuration, the two second light shields may be respectively disposed at two opposite corners of the support frame located closer to the bottom side of the casing.

Moreover, the second light shield 70 is an optional component; in some other embodiments, the monitor may not have any second light shield when there is no need to prevent light from leaking at the position where the second light shield 70 is disposed as described above.

The adhesive components 80 are, for example, double-sided tapes. The adhesive components 80 are disposed on the first support portion 142 and the second support portion 143. Different sides of the display panel 30 are respectively fixed to the first support portion 142 and the second support portion 143 via the adhesive components 80 so as to be supported by the first support portion 142 and the second support portion 143. In this embodiment, a length L1 that the second support portion 143 protrudes from the outer surface 14131 of the side plate 1413 is greater than a length L2 that the display panel 30 protrudes from the outer surface 14131 of the side plate 1413. Similarly, a length that the first support portion 142 protrudes from the outer surface 14121 of the side plate 1412 is greater than a length that display panel 30 protrudes from the outer surface 14121 of the side plate 1412, where the figures does not show the length relationship between them, but such arrangement is similar to the arrangement shown in FIG. 6, and thus can be also referred to FIG. 6. Accordingly, during the installation of the assembly of the display panel 30, the light-emitting module 20 and the support frame 14 into the accommodation space 111 of the casing 11, the display panel 30 can be prevent from being damaged by the casing 11.

Note that the length L1 that the second support portion 143 protrudes from the outer surface 14131 of the side plate 1413 is not restricted to being greater than the length L2 that the display panel 30 protrudes from the outer surface 14131 of the side plate 1413. In some other embodiments, in a case that the display panel may not be damaged by the casing during installation, the length that the second support portion protrudes from the outer surface of the side plate may be smaller than or equal to the length that the display panel protrudes from the outer surface of the side plate. Similarly, the length that the first support portion protrudes from the outer surface of the side plate may be smaller than or equal to the length that display panel protrudes from the outer surface of the side plate.

In this embodiment, the accommodation portion 141 of the support frame 14 has the accommodation recess 1415, and the first support portion 142 and the second support portion 143 of the support frame 14 are located close to the opening 1416 of the accommodation recess 1415 and respectively protrude outwardly from outer surfaces 14121 and 14131 of the accommodation portion 141 facing away from the accommodation recess 1415, such that the light-emitting module 20 can be accommodated in the accommodation recess 1415, and the display panel 30 is supported by the first support portion 142 and the second support portion 143. Therefore, the support frame 14 simultaneously supports the light-emitting module 20 and the display panel 30. Accordingly, even if the monitor 1 is a large-sized monitor, the monitor 1 can be still light and thin. For example, the thickness of the thinnest portion at the lateral side of the monitor 1 is merely about 6.5 mm.

In addition, since the light-emitting module 20 and the display panel 30 are supported by the same support frame 14, there is no need to produce molds of different support frame for the light-emitting module 20 and the display panel 30; that is, only the mold of the support frame 14 is required to be produced, thereby saving the cost in producing mold. Moreover, the structure of the support frame 14 is simple, and thus the cost of the mold of the support frame 14 is also inexpensive. Therefore, the large-sized monitor 1 having a light and thin configuration can still be manufactured in low cost.

Furthermore, since the first support portion 142 and the second support portion 143 of the support frame 14 are located close to the opening 1416 of the accommodation recess 1415 and respectively protrude outwardly from the outer surfaces 14121 and 14131 of the accommodation portion 141 facing away from the accommodation recess 1415, the light-emitting module 20 can be directly placed into the accommodation recess 1415 during the installation of the light-emitting module 20. Therefore, the light-emitting module 20 can be easily installed into the accommodation portion 141.

Figure 7:
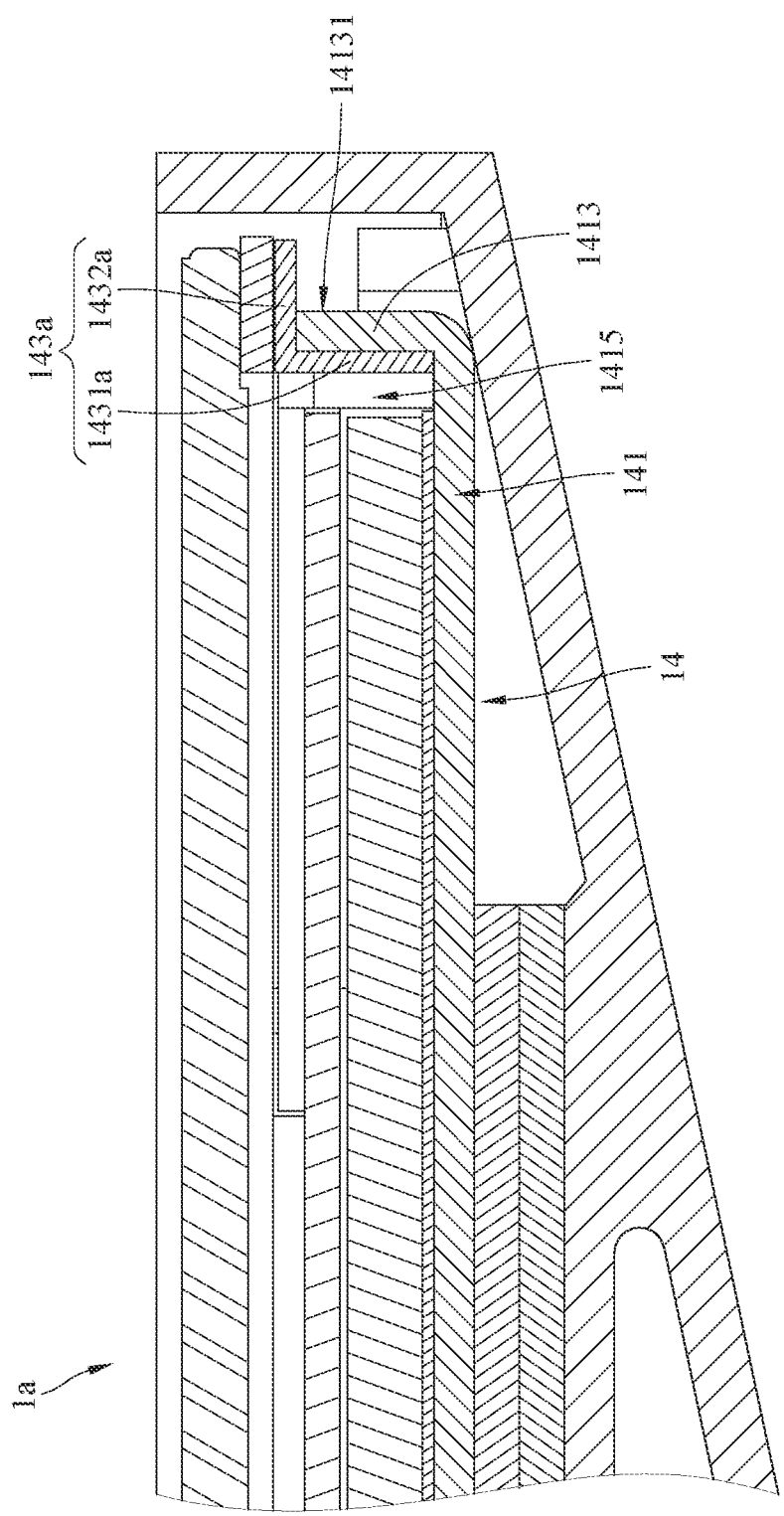
FIG. 7 is a partial cross-sectional view of a monitor according to a second embodiment of the disclosure.

Then, refer to FIG. 7, where FIG. 7 is a partial cross-sectional view of a monitor 1a according to a second embodiment of the disclosure.

The monitor 1a of this embodiment is similar to the monitor 1 with reference to FIGS. 1 to 7, the main difference between them is the support portion of the support frame. Therefore, in the monitor 1a of this embodiment, the same components as the monitor 1 use the same reference numerals, and the related introductions will be omitted hereinafter. The following paragraphs merely introduce the main difference between the monitors 1a of this embodiment and the monitor 1.

In this embodiment, the support portion 143a of the support frame 14 is mounted on the accommodation portion 141. Specifically, the support portion 143a includes a mount portion 1431a and a protruding portion 1432a connected to each other. The mount portion 1431a and the protruding portion 1432a together form a L-shaped plate. The mount portion 1431a is located in the accommodation recess 1415 of the accommodation portion 141 and fixed to the side plate 1413, and the protruding portion 1432a protrudes from the outer surface 14131 of the side plate 1413 facing away from the accommodation recess 1415. As for the support portion connected to the side plate 1412 (as shown in FIG. 2), although it is not shown in figures, the structure of the support portion and the connection between the support portion and the side plate 1412 are similar to the structure of the support portion 143a and the connection between the support portion 143a and side plate 1413, and thus can be referred to FIG. 7.

The support frames of the above embodiments each include plural support portions, but the disclosure is not limited thereto; in some other embodiments, the support frame may include only one support portion.

Moreover, the structures of the accommodation portions of the support frames of the above embodiments are not restricted in the disclosure and may be modified in some other embodiments according to actual requirements.

According to the casing assemblies and the monitors as discussed in the above embodiments, the support frame has the accommodation recess, and the support portion is connected to the accommodation portion and protrudes outwardly from the accommodation portion, such that the light-emitting module can be accommodated in the accommodation recess, and the display panel is supported by the support portion. Therefore, the support frame simultaneously supports the light-emitting module and the display panel. Accordingly, even if the monitor is a large-sized monitor, the monitor can be still light and thin, and the monitor can be produced in low cost.

Moreover, since the support portion is located close to the opening of the accommodation recess and protrudes outwardly from the outer surface of the accommodation portion facing away from the accommodation recess, the light-emitting module can be directly placed into the accommodation recess during the installation of the light-emitting module. Therefore, the light-emitting module can be easily installed into the accommodation portion.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. A monitor, comprising:
a casing assembly, comprising:
a casing; and
a support frame, disposed in the casing, wherein the support frame comprises an accommodation portion and at least one support portion, the accommodation portion is connected to the casing, the at least one support portion is connected to the accommodation portion and protrudes from the accommodation portion, and the accommodation portion and the at least one support portion are made of a single piece;
a light-emitting module, disposed in the accommodation portion; and
a display panel, supported by the at least one support portion;
wherein the casing assembly further comprises at least one first light shield, the at least one support portion is a plurality of support portions, the plurality of support portions respectively protrude from different sides of the accommodation portion, the at least one first light shield comprises a first extension portion and a second extension portion, the first extension portion and the second extension portion respectively extend along two different directions, and the first extension portion and the second extension portion are respectively fixed to two of the plurality of support portions, the second extension portion has a contact surface, a support surface and a positioning recess, the contact surface and the support surface of the second extension portion of the at least one first light shield respectively face different directions, the support surface supports the display panel, different sides of the positioning recess are located at the contact surface and the support surface of the second extension portion of the at least one first light shield, the light-emitting module further comprises an optical film, the optical film has a protrusion portion, and the protrusion portion of the optical film is engaged with the positioning recess.

2. The monitor according to claim 1, wherein a length that at least one of the plurality of support portions protrudes from the accommodation portion is greater than a length that the display panel protrudes from the accommodation portion.

3. The monitor according to claim 1, further comprising at least one adhesive component, wherein the display panel is fixed to at least one of the plurality of support portions via the at least one adhesive component.

4. The monitor according to claim 1, wherein the at least one first light shield comprises a connection portion, the first extension portion and the second extension portion respectively extend from the connection portion along the two different directions.

5. The monitor according to claim 4, wherein each of the two of the plurality of support portions has an engagement hole, each of the first extension portion and the second extension portion has an engagement protrusion, the engagement protrusion of the first extension portion and the engagement protrusion of the second extension portion are respectively engaged with the two engagement holes of the two of the plurality of support portions.

6. The monitor according to claim 4, wherein the light-emitting module comprises a light guide, the first extension portion has a contact surface, the contact surface of the first extension portion and the contact surface of the second extension portion are respectively in contact with two different sides of the light guide.

7. The monitor according to claim 6, wherein the casing has a top side and a bottom side located opposite to each other, the plurality of support portions comprise a first support portion and a second support portion, the first support portion is located closer to the top side of the casing than the second support portion, the first extension portion and the second extension portion are respectively fixed to the first support portion and the second support portion, the optical film is stacked on the light guide.

8. The monitor according to claim 4, further comprising at least one second light shield, wherein the casing has a top side and a bottom side located opposite to each other, the plurality of support portions comprise a first support portion and a second support portion, the first support portion is located closer to the top side of the casing than the second support portion, the first extension portion and the second extension portion are respectively fixed to the first support portion and the second support portion, the at least one second light shield is disposed on the accommodation portion, and the at least one second light shield and the second extension portion are respectively located at two opposite sides of the second support portion.

9. The monitor according to claim 1, wherein the casing assembly further comprises a positioning component, the positioning component is fixed to the casing, the support frame further comprises a positioning portion, the positioning portion is connected to at least one of the plurality of support portions, the positioning portion has an insertion hole, and the positioning component is inserted into the insertion hole.

10. The monitor according to claim 1, wherein the casing assembly further comprises a first engagement component and a second engagement component, the first engagement component is fixed to the casing, the second engagement component is fixed to the accommodation portion, and the accommodation portion is fixed to the casing via the first engagement component and the second engagement component.

11. The monitor according to claim 10, wherein the first engagement component and the second engagement component are hook-and-loop fasteners.

12. The monitor according to claim 1, wherein the accommodation portion comprises a bottom plate and a plurality of side plates, the plurality of side plates are respectively connected to different sides of the bottom plate, the plurality of side plates and the bottom plate together form an accommodation recess, the plurality of support portions protrude from ends of the plurality of side plates located opposite to the bottom plate, and the light-emitting module is disposed in the accommodation recess.

13. The monitor according to claim 12, wherein the casing has a top side and a bottom side located opposite to each other, the plurality of support portions comprise a first support portion and a second support portion, the first support portion and the second support portion respectively protrude from ends of the plurality of side plates located opposite to the bottom plate, the first support portion is located closer to the top side of the casing than the second support portion, the casing assembly further comprises a positioning component, the positioning component is located in the casing and fixed to the casing, the support frame further comprises a positioning portion, the positioning portion is connected to the second support portion, the positioning portion has an insertion hole, and the positioning component is inserted into the insertion hole.

14. A casing assembly, comprising:
a casing;
a positioning component, fixed to the casing; and
a support frame, disposed in the casing, wherein the support frame comprises an accommodation portion, at least one support portion and a positioning portion, the accommodation portion is fixed to the casing, the at least one support portion is connected to the accommodation portion and protrudes from the accommodation portion, the accommodation portion and the at least one support portion are made of a single piece, the positioning portion is connected to the at least one support portion, and the positioning portion is engaged with the positioning component;

wherein the casing assembly further comprises at least one first light shield, the at least one support portion is a plurality of support portions, the plurality of support portions respectively protrude from different sides of the accommodation portion, the at least one first light shield comprises a first extension portion and a second extension portion, the first extension portion and the second extension portion respectively extend along two different directions, and the first extension portion and the second extension portion are respectively fixed to two of the plurality of support portions, the second extension portion has a contact surface, a support surface and a positioning recess, the contact surface and the support surface of the second extension portion of the at least one first light shield respectively face different directions, the support surface is configured to support a display panel, different sides of the positioning recess are located at the contact surface and the support surface of the second extension portion of the at least one first light shield, and the positioning recess is configured to be engaged with a protrusion portion of an optical film.

15. The casing assembly according to claim 14, further comprising a first engagement component and a second engagement component, wherein the first engagement component is fixed to the casing, the second engagement component is fixed to the accommodation portion, and the accommodation portion is fixed to the casing via the first engagement component and the second engagement component.

16. The casing assembly according to claim 14, wherein the accommodation portion comprises a bottom plate and a plurality of side plates, the plurality of side plates are respectively connected to different sides of the bottom plate, the plurality of side plates and the bottom plate together form an accommodation recess, the plurality of support portions protrude from ends of the plurality of side plates located opposite to the bottom plate.

17. The casing assembly according to claim 16, wherein the casing has a top side and a bottom side located opposite to each other, the plurality of support portions comprise a first support portion and a second support portion, the first support portion and the second support portion respectively protrude from ends of the plurality of side plates located opposite to the bottom plate, the first support portion is located closer to the top side of the casing than the second support portion, the positioning portion is connected to the second support portion.

18. The casing assembly according to claim 14, wherein the positioning portion has an insertion hole, and the positioning component is inserted into the insertion hole.

\* \* \* \* \*